INVENTORS
BENJAMIN CLAYTON
RALPH EVERETT BURNS

ATTORNEY.

Nov. 5, 1935.　　B. CLAYTON ET AL　　2,019,776
APPARATUS FOR PRODUCING SOAP
Original Filed June 28, 1933　2 Sheets-Sheet 2

INVENTORS
BENJAMIN CLAYTON
RALPH EVERETT BURNS
BY *Fred W Lawie*
ATTORNEY.

Patented Nov. 5, 1935

2,019,776

UNITED STATES PATENT OFFICE 2,019,776

APPARATUS FOR PRODUCING SOAP

Benjamin Clayton, Sugarland, Tex., and Ralph Everett Burns, Los Angeles, Calif., assignors to Refining, Inc., Reno, Nev., a corporation of Nevada Original application June 28, 1933, Serial No. 678,030. Divided and this application July 13, 1934, Serial No. 734,962

5 Claims. (Cl. 87—16)

Our invention relates to the manufacture of soap and the principal object of the invention is to provide a process and apparatus for producing soap in a very rapid, economical, and efficient manner.

A further object of the invention is to provide a continuous process by which a saponifiable fat is converted into bar soap by a continuous process.

Further objects and advantages of our invention will be made evident hereinafter.

In the process of producing soap it is standard practice to mix a saponifying alkali, hereinafter sometimes called the "reagent", with a saponifiable fat, hereinafter sometimes called simply the "fat", and to agitate and heat the mixture until the fat is broken up into glycerine and fatty acids, the fatty acids combining with the alkali to produce the soap. By the term "saponifiable fat", we wish to be understood to mean any fat which could be used in the known processes of making soap, and by a "saponifying alkali" we wish to be understood to mean any of the alkalies which are at present used in soap making. In practice we prefer to use an aqueous solution of caustic soda, although caustic potash, soda ash, and other alkalies may be used.

The process of making soap which is generally practiced involves the placing of the fat in a large kettle in which it is heated and to which the alkali is added, the fat being agitated during this addition to produce an intimate mixture of the alkali with the fat. After the fat and alkali have been thoroughly mixed together in the proper proportions, which is readily determined by the skilled soap maker, the charge is heated and agitated for a considerable period until practically all of the fats are broken up and the fatty acids thereof are combined with the alkali.

Our process has many advantages over the present soap making processes, as will be made evident hereinafter.

A convenient apparatus for carrying on the process invented by us is shown in the accompanying drawings, in which, Fig. 1 is a diagrammatic representation of an assembly of different units used to carry on the process.

Figure 1:
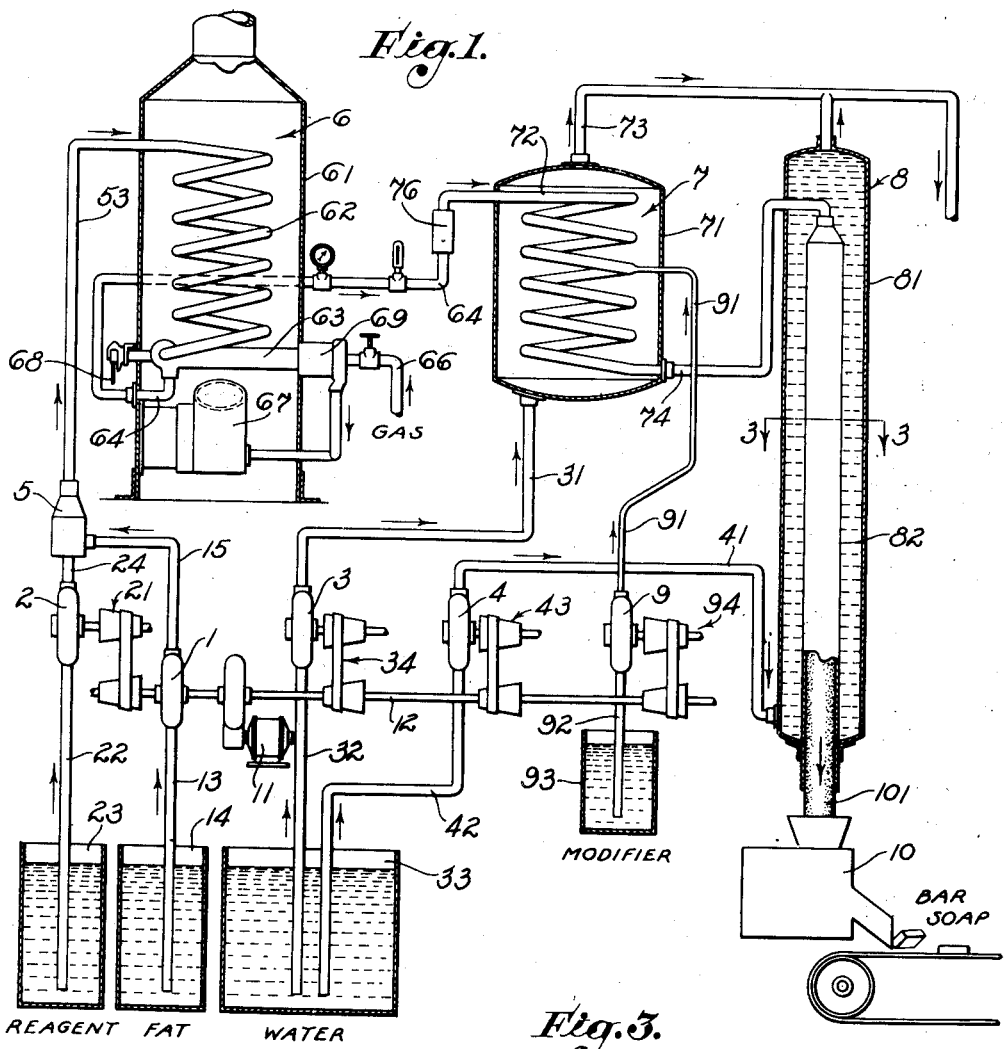

The apparatus employed consists of a fat pump 1, a reagent pump 2, a primary water pump 3, a secondary water pump 4, a mixer 5, a heater 6, a cooler 7, an extruder 8, a modifier pump 9, and a bar fabricator 10.

The pump 1 is driven directly from a main shaft 12 which is driven by a motor 11. The pump 1 draws fat through a pipe 13 from a fat supply tank 14 and delivers this fat under pressure through a pipe 15 to the mixer 5.

The reagent pump 2 is driven from the main shaft 12 through a variable speed gear 21, the pump 2 taking reagent through a pipe 22 from a reagent tank 23 and delivering this reagent through a pipe 24 to the mixer 5.

The variable speed gear 21 and certain other variable speed gears 34, 43, and 94, hereinafter referred to, are shown diagrammatically as consisting of two reverse cone pulleys connected by a belt, the position of which on the pulleys can be fixed in any position by the operator of the plant, thus fixing the relative speeds of the two pulleys at a ratio between a lower and a higher limit. This type of variable speed drive is used merely for illustrative purposes since it is well known in the arts. Other types of variable speed gears by which the operator can regulate the proportional speed of any pump may be substituted therefor if desired.

Figure 2:
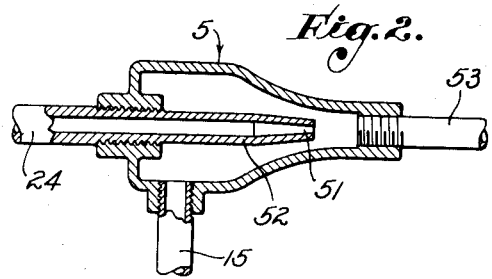
Fig. 2 is a cross-section through a convenient form of mixer.
Figure 3:
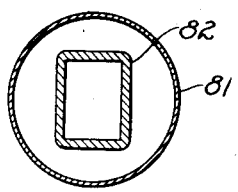
Fig. 3 is a section through the ejector nozzle of the invention shown in Fig. 1.
Figure 4:
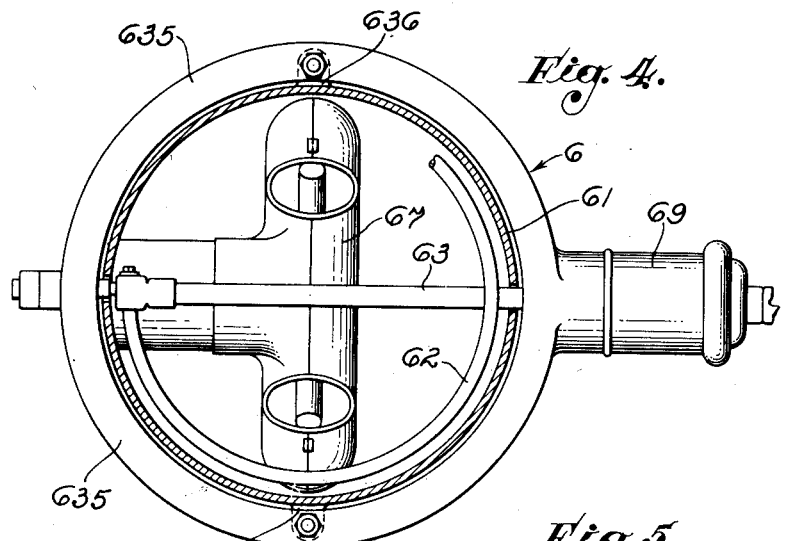
Fig. 4 is a plan view partially in section of the lower portion of the heater 6 showing the thermostat and burner.

The exact form of the mixer 5 is not important, that shown in Fig. 2, however, being a convenient form. In the form shown a casing 51 surrounds a central pipe 52 through which the reagent is pumped, the fat from the pipe 15 being delivered to the space around this central pipe 52. The reagent and fat are combined or mixed as they leave the mixer 5 and the mixture so produced is delivered through a pipe 53 to the heater 6.

The heater 6 consists of an outer shell 61 in which is mounted a pipe coil 62. The lower end of this pipe coil delivers liquid to a thermostat 63 from which the liquid is delivered through a pipe 64 to the cooler 7. A valve or other control device 69 controls the flow of gas or other fuel from a pipe 66 to a burner 67, the valve 69 having the function of regulating the supply of gas passed to the burner. The thermostat 63 forms an automatic means responsive to changes in temperature of the liquid passing therethrough from the coil 62 for actuating the control device. Adjusting means 68 may be provided on the thermostat. The hot products of combustion from the burner 67 constitute a heating medium for the coil 62 and the amount of heat delivered to this coil is, of course, regulated by the amount of gas which is passed to the burner.

The heater shown is that disclosed in the application of Walter B. Kerrick, Serial 495,635, filed Nov. 14, 1930, Figs. 4, 5, 6, and 7 being drawings copied from that application.

Figure 5:
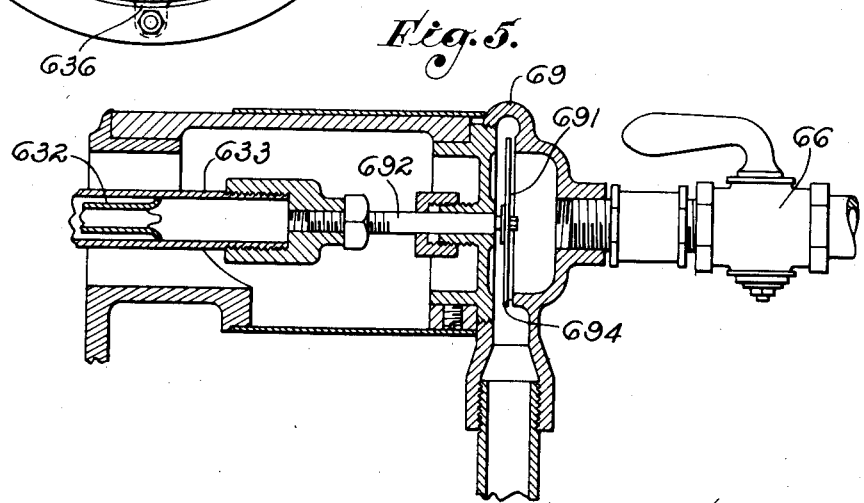
Fig. 5 is a section drawn on an enlarged scale through the right-hand end of the thermostat as viewed in Fig. 1.
Figure 7:
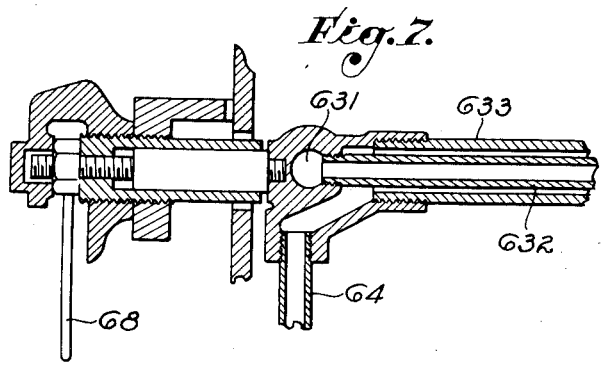
Fig. 7 is a section on an enlarged scale through the left-hand end of the thermostat as viewed in Fig. 1.
Figure 6:
Fig. 6 is a section showing the method of supporting the thermostat.

The end of the coil 62 communicates with an opening 631 which communicates with an inner pipe 632, the end of which is open as shown in Fig. 5 and which communicates with an outer pipe 633. This outer pipe connects to the pipe 64 so that liquid from the coil 62 flows through the pipe 632 into the right-hand end of the pipe 633 and inside this pipe from right to left, this liquid being finally delivered to the pipe 64. Due to the passage of hot liquid through the pipes 632 and 633 the pipe 633 expands or contracts and operates a valve 691 forming part of the control device 69 as shown in Fig. 5, being operated through a stem 692 from the pipe 633. The expansion or contraction of the pipe 633 therefore moves the valve 691 towards or away from a seat 694 which controls the flow of gas from the pipe 66, thus regulating the amount of gas delivered to the burner 67. The adjusting means 68 shown in Fig. 7 tends to move the thermostat bodily so that the temperature at which the valve 691 closes may be regulated by the operator at will. The entire thermostat is mounted on a ring 635 which encircles the shell 61 and is supported on suitable lugs 636.

The cooler 7 may be of any convenient form, that shown consisting of a tank 71 inside which is a cooling coil 72, the inlet end of which is connected to the pipe 64. Cooling water is delivered to the tank 71 through a pipe 31 from the primary water pump 3, this water being taken through a pipe 32 from a water tank 33. The primary water pump 3 is driven from the shaft 12 through a variable speed gear 34. Excess water and steam are removed from the top of the tank 71 through a release pipe 73. The coil 72 is connected through a pipe 74 to the upper end of the extruder 8.

Modifier may be delivered to the coil 72 through a pipe 91 from the modifier pump 9, this pump drawing material through a pipe 92 from a tank 93. The pump 9 is driven from the shaft 12 through a variable speed gear 94. The extruder 8 consists preferably of a cylindrical tank 81 inside which is placed an extrusion member 82 which may have a round bore or a rectangular bore as shown. Water is delivered to the bottom of the cylindrical casing 81 through a pipe 41 from the pump 4, this water being drawn through a pipe 42 from the water tank 33. The pump 4 is driven from the shaft 12 through a variable speed gear 43.

The bar fabricator 10 is well known in the art and the details thereof will not be described. Its purpose is to receive a continuously extruded bar of solidified soap and to cut it up into bars, or, if necessary, to cut it up into flakes or granules.

The materials in the tanks 14, 23, 33, and 93 are replenished from time to time as they become partially used and automatic means for accomplishing this may be provided if desired.

If the fat which is used is not liquid at room temperatures, means, not shown, must be provided in the tank 14 for heating it so that it is rendered sufficiently liquid to pump readily.

Suitable valves, not shown, are provided for controlling the flow of liquids conveniently, and suitable gauges and thermometers, not shown, are provided for indicating conditions within the apparatus.

The method of operation is as follows:

Fat is pumped continuously by the pump 1 from the tank 14 through the pipe 15 into the mixer 5. The speed at which the fat is pumped may be regulated by changing the speed of the motor 11.

Reagent is pumped continuously from the tank 23 to the mixer 5 through the pipe 24 by the pump 2. The variable speed gear 21 permits the rate at which reagent is added to the fat to be varied within limits. The proportion of reagent so added depends, of course, upon the character of the fat used. If an aqueous solution of caustic soda is used having a gravity of 30° Baumé and a mixture of equal parts of tallow and cocoanut oil is to be treated, it will be found that if reagent is supplied at the rate of about forty-five per cent of the volume of the fat, good results will be obtained. The amount of reagent which should be supplied to produce good saponification without leaving too much excess reagent or excess unsaponified fat is, of course, readily determinable by any skilled soap maker.

Using a coil 62 consisting of about 300 feet of pipe ½ inch inside diameter, good results can be obtained if from one-third gallon to one gallon per minute of fat is delivered to the mixer 5.

The pumps 1 and 2, the variable speed gear 21, and the mixer 5, taken collectively, constitute a proportioning device having the function of delivering a mixture of fat and reagent (in proper proportions) to the coil 62 of the heater. Other means of performing this function will be obvious to one skilled in the art. For example, the mixture of fat and reagent may be produced in the tank 14, in which case the tank 23, the pump 2, the variable speed gear 21, and the mixer 5 may be dispensed with, the pipe 15 being connected to the pipe 53. The arrangement shown has, however, certain advantages, among which may be mentioned the automatic mixing in the right proportion and the ease by which this proportion can be changed by varying the speed of the pump 2 by manipulating the variable speed gear 21.

The function of the mixer 5 is to bring the fat and reagent together and while the mixer shown jets the reagent into the oil, and this is a convenient method of producing an intimate mixture, this is not necessary since the fat and reagent are thoroughly mixed due to the mild turbulence produced in the coil 62.

The function of the heater 6 is primarily to raise the temperature of mixture of fat and reagent to a point at which saponification is facilitated. It will be found that excellent results are obtained if a temperature of from 400 to 500° F. is maintained in the coil 62. For reasons which will be hereinafter explained it will be found possible to maintain a pressure of from 150 to 500 pounds per square inch on the liquid leaving the coil 62 and this pressure also assists in splitting the fat into free fatty acid and glycerine, the free fatty acid combining with the reagent to produce soap. The reaction between the fat and reagent seems to be facilitated by the velocity and mild turbulence produced in the mixed fat and reagent as it flows through the coil 62. This turbulence tends to constantly disperse any uncombined reagent in the body of the mixture so that it is brought into intimate contact with any particles of unsaponified fat, thus promoting the desired saponification reaction.

The thermostat 63 plays an important part in the operation of the process. Its function is to insure that the mixture flowing through the pipe 64 is maintained at a constant temperature. Any increase in this temperature expands the pipe 633 and tends to force the valve 691 towards its seat 694. This tends to reduce the amount of fuel gas passing to the burner 67 and this reduces the volume of the heating medium; that is, the hot products of combustion, passing from the burner 67 up into the space surrounding the coil 62 where it is available to heat the mixture of fat and reagent passing through the coil 62.

The material passing through the pipe 64 is preferably in liquid condition. This material is cooled in the cooler 7. The degree of this cooling is regulated by adjusting the amount of water supplied to the cooler 7 by the pump 3. This regulation can be conveniently made by adjusting the speed of the pump 3 by the variable speed gear 34. Due to the fact that the pumps 1, 2, and 3 are all driven by the shaft 12, all three pumps act as proportioning pumps, so that the amount of cooling in the cooler 7 is proportioned to the rate of supply of raw materials and varies directly with any variation in that rate.

In the production of soap it is often desired to add to the soap during manufacture certain substances such as inert fillers, coloring, or scent producing substances, or the like. It is often desirable to introduce such substances after the temperature of the soap has been lowered somewhat from that at which the reaction is produced. For convenience we call all such substances "modifiers". They may affect either the physical or chemical characteristics of the soap, or both.

Such modifiers may be conveniently introduced into the coil 72 of the cooler 7 through the pipe 91 from the pump 9. Since this pump is also driven from the shaft 12 through the variable speed gear 94, the proportion in which modifier is introduced can be maintained constant or varied by the operator of the plant.

The functions of the extruder 81 are two in number. First, it forms a homogeneous bar of solid soap which is continuously fed out of the bottom end thereof as shown at 101; and, second, it provides sufficient friction resistance to the flow of this bar to allow a considerable pressure to be carried in the coil 62.

In practice it is preferable to so regulate the cooling of the soap in the cooler 7 that it is still liquid as it passes through the pipe 74 into the upper end of the extrusion member 82. The soap then gradually cools as it passes downwardly through the extrusion member, the degree of this hardening being controlled by regulating the speed at which the pump 4 feeds cooling water through the pipe 41, which is, of course, regulated by manipulating the variable speed gear 43.

The regulation of the plant is somewhat improved if a member 76 having a constricted orifice is placed in the pipe 64. The hot material flowing from the heater 6 to the cooler 7 passes through this constricted orifice and considerable fluid friction is built up therein. This fluid friction is not dependent upon the action of the extruder but is largely dependent upon the amount of steam formed in the coil 62. This steam is, of course, condensed in the cooler 7. If the amount of steam produced in the coil 62 is increased so that the volume of the material passing through the constricted orifice of the member 76 is increased, the pressure drop in the constricted orifice is increased and the pressure in the cooler 7 available to produce extrusion through the extruding member 82 is lowered. This slows down the extrusion and the amount of steam passing through the orifice in the member 76 falls, thus decreasing the pressure drop in the orifice and increasing the pressure available for extrusion.

This application is a division of our application Serial 678,030, filed June 28, 1933.

We claim as our invention:

1. An apparatus for producing soap, comprising: a heater for raising the temperature of a mixture of saponifiable fat and saponifying alkali by heat transmitted through the walls thereof; pumping means for supplying said mixture to said heater by applying sufficient pressure thereto to cause said mixture to flow into said heater against any pressure that may be built up therein; a cooler for reducing the temperature of the soap produced in said heater so that said soap is solidified by removing heat from said soap through the walls of said cooler; and a member having an orifice through which said soap is ejected after it leaves said cooler, said orifice being so proportioned as to insure the building up of considerable pressure in said cooler by exerting frictional resistance on said solidified soap.

2. An apparatus for producing soap, comprising: a heater for raising the temperature of a mixture of saponifiable fat and saponifying alkali by heat transmitted through the walls thereof; pumping means for supplying said mixture to said heater by applying sufficient pressure thereto to cause said mixture to flow into said heater against any pressure that may be built up therein; means for supplying heat to the liquid in said heater by supplying a hot heating medium to said heater; a cooler for reducing the temperature of the soap produced in said heater so that said soap is solidified by removing heat from said soap through the walls of said cooler; and a member having an orifice through which said soap is ejected after it leaves said cooler, said orifice being so proportioned as to insure the building up of considerable pressure in said cooler by exerting frictional resistance on said solidified soap.

3. An apparatus for producing soap, comprising: a heater for raising the temperature of a mixture of saponifiable fat and saponifying alkali by heat transmitted through the walls thereof; pumping means for supplying said mixture to said heater by applying sufficient pressure thereto to cause said mixture to flow into said heater against any pressure that may be built up therein; means for supplying heat to the liquid in said heater by supplying a hot heating medium to said heater; a control device for regulating the amount of heat supplied to said heater by controlling the supply of hot heating medium thereto; a cooler for reducing the temperature of the soap produced in said heater so that said soap is solidified by removing heat from said soap through the walls of said cooler; and a member having an orifice through which said soap is ejected after it leaves said cooler, said orifice being so proportioned as to insure the building up of considerable pressure in said cooler by exerting frictional resistance on said solidified soap.

4. An apparatus for producing soap, comprising: a heater for raising the temperature of a mixture of saponifiable fat and saponifying alkali by heat transmitted through the walls thereof; pumping means for supplying said mixture to said heater by applying sufficient pressure thereto to cause said mixture to flow into said heater against any pressure that may be built up therein; means for supplying heat to the liquid in said heater by supplying a hot heating medium to said heater; a control device for regulating the amount of heat supplied to said heater by controlling the supply of hot heating medium thereto; automatic means responsive to changes in the temperature of the soap leaving said heater for insuring a constant temperature on said soap by operating said control device; a cooler for reducing the temperature of the soap produced in said heater so that said soap is solidified by removing heat from said soap through the walls of said cooler; and a member having an orifice through which said soap is ejected after it leaves said cooler, said orifice being so proportioned as to insure the building up of considerable pressure in said cooler by exerting frictional resistance on said solidified soap.

5. An apparatus for producing soap by treating saponifiable material with a saponifying reagent under heat and pressure, which comprises: a heater in which reaction between the saponifiable material and the reagent is produced; means for supplying heat to the mixture of saponifiable material and reagent while said material is in said heater; pumping means for pumping said mixture continuously into said heater; walls forming an orifice through which the soap produced by said reaction is extruded due to the pressure produced by said pumping means; and means for regulating the pressure maintained in the heater by cooling the soap after it leaves the heater and before it reaches the orifice and thus regulating the friction of extrusion and the back pressure produced thereby.

BENJAMIN CLAYTON.
RALPH EVERETT BURNS.